United States Patent
Phan et al.

(10) Patent No.: US 7,079,484 B2
(45) Date of Patent: Jul. 18, 2006

(54) MANAGEMENT METHOD FOR MAINTAINING COMMUNICATIONS OPTIONS WITHIN A PRIVATE COMMUNICATIONS NETWORK

(75) Inventors: Cao Thanh Phan, Rueil Malmaison (FR); Karine Villatte, La Garenne Colombes (FR)

(73) Assignee: Alcatel, Paris (FR)

( * ) Notice: Subject to any disclaimer, the term of this patent is extended or adjusted under 35 U.S.C. 154(b) by 900 days.

(21) Appl. No.: 09/749,675

(22) Filed: Dec. 28, 2000

(65) Prior Publication Data

US 2001/0007550 A1    Jul. 12, 2001

(30) Foreign Application Priority Data

Jan. 6, 2000    (FR)    .................................... 00 00119

(51) Int. Cl.
*H04L 12/26*    (2006.01)

(52) U.S. Cl. .................. 370/225; 370/242; 340/825.01

(58) Field of Classification Search ........ 370/225–228, 370/216–224, 242, 245, 357, 384; 340/2.23, 340/825.01; 398/2, 5
See application file for complete search history.

(56) References Cited

U.S. PATENT DOCUMENTS

| | | | |
|---|---|---|---|
| 5,031,211 A | | 7/1991 | Nagai et al. |
| 5,058,105 A | * | 10/1991 | Mansour et al. ............ 370/228 |
| 5,274,697 A | * | 12/1993 | Schroeder et al. ........ 379/93.31 |
| 5,479,407 A | * | 12/1995 | Ko et al. ..................... 370/231 |
| 5,646,936 A | * | 7/1997 | Shah et al. .................. 370/228 |
| 5,659,542 A | | 8/1997 | Bell et al. |
| 5,715,237 A | * | 2/1998 | Akiyoshi ..................... 370/228 |
| 5,737,316 A | * | 4/1998 | Lee ............................. 370/248 |
| 5,959,972 A | * | 9/1999 | Hamami ..................... 370/228 |
| 6,339,585 B1 * | | 1/2002 | Hulyalkar et al. .......... 370/226 |
| 6,356,622 B1 * | | 3/2002 | Hassell et al. ............. 379/1.01 |
| 6,411,600 B1 * | | 6/2002 | Kwak et al. ................. 370/225 |
| 6,430,150 B1 * | | 8/2002 | Azuma et al. .............. 370/218 |
| 6,452,934 B1 * | | 9/2002 | Nakata ........................ 370/428 |
| 6,597,658 B1 * | | 7/2003 | Simmons .................... 370/221 |
| 6,826,146 B1 * | | 11/2004 | Blenis et al. ............... 370/227 |
| 2003/0107987 A1 * | | 6/2003 | Kinstler ...................... 370/228 |

FOREIGN PATENT DOCUMENTS

EP        0 967 829 A1    12/1999
JP        06 104 924 A    4/1994

* cited by examiner

*Primary Examiner*—Steven Nguyen
*Assistant Examiner*—Clemence Han
(74) *Attorney, Agent, or Firm*—Sughrue Mion, PLLC

(57) ABSTRACT

The method enables a set of services to be maintained within a private communications network even in the event of the network becoming split. It uses emergency means providing dynamic accesses that are previously defined by the user of the network. The dynamic accesses serve to carry signaling signals. Calls are routed using a method of routing that is both static and predetermined, imposing a path that is predetermined before a fault occurs, thereby making it possible for the network to react more quickly once it detects faulty operation.

9 Claims, 1 Drawing Sheet

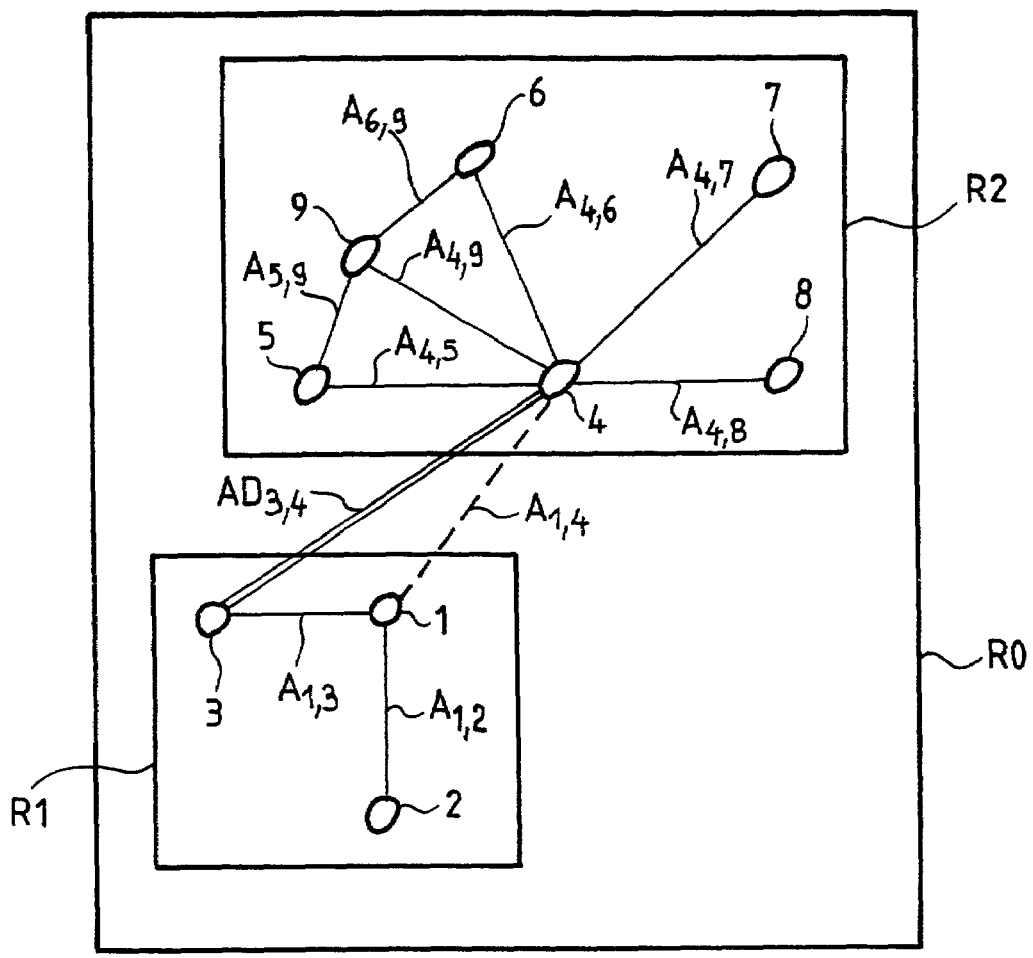

MANAGEMENT METHOD FOR MAINTAINING COMMUNICATIONS OPTIONS WITHIN A PRIVATE COMMUNICATIONS NETWORK

The invention relates to a management method for maintaining communications options within a private communications network.

BACKGROUND OF THE INVENTION

More particularly, the invention relates to a method which makes it possible to continue to have access to a set of services within a private communications network, said network enabling a plurality of items of equipment to communicate with one another via two-way communications links, even in the event of a dedicated link failing, thereby causing the communications network in question to be split.

The general context of the invention is that of a network of items of equipment made up in particular of nodes e.g. representing private exchanges interconnected by two-way communications trunks, said network being connected to a circuit-switched public network.

In general, a trunk between two terminals defines a set of accesses to the terminals. These accesses are transmission lines rented or purchased by users from a public service. Physically accesses comprise a plurality of channels. Thus, for example, a "basic" T0 type access carries two data transmission channels known as B channels operating at a bit rate of 64 kilobits per second (Kbps), plus one signaling channel known as a D channel whose data rate is 16 Kbps. So-called "primary" T2 type accesses support thirty B channels and one D channel, with all of the channels operating at a rate of 64 Kbps.

All of those accesses are said to be multipurpose in the sense that each of them is capable, within the limit of its own data rate, of supplying all of the services offered by the network. In general, a B channel is a channel that can be used for carrying any type of information, whether its frames contain data or voice. A D channel is a channel suitable for carrying signaling messages specific to various services. The D channel is used essentially for setting up a call over one of the channels within the access itself. By way of example it conveys information sent in the form of a set-up message by a terminal which is requesting a call with another terminal. This information can be a D channel number, a destination address, a type of service, . . . .

The various signaling or data channels are rented from a public service by the user. The signaling channel or D channel is set up permanently between the two terminals that are situated at its ends. The user thus pays for permanent use of this channel. However, the cost of the data channels or B channels depends on the type of access which is associated therewith. The cost of these channels can be made up of a flat rate subscription plus an amount that depends on call time and on call distance. The user of a network of the type to which the method of the invention applies therefore keeps down the number of B channels rented and keeps down the use that is made of them for reasons of economy. In addition, the D channels can be used to transmit some data. This data is not telephone data but rather packets of data, e.g. as passed between two computers or terminals. Since the cost of using the D channels does not depend on the volume of information passing over the channel, the user makes maximum use of the D channel.

Thus, the signaling channel can be used to convey digital signals enabling a variety of services to be made available within the network in question. For example, these services can be options made available to a user, such as automatically transferring calls from one terminal of the network to another terminal of the network, automatic recalls, intercepting calls, . . . .

Signaling channels are also heavily used in call distribution methods. The essential function of call distribution methods is to put an outside user seeking to benefit from a specific service or to obtain some particular information into communication with a particular operator having the appropriate competence for replying to the user's request. In call distribution facilities, all of the information relating to a dynamic routing travels over the signaling channels. Dynamic routing makes it possible instantaneously to analyze the state of the call distribution facility together with the resources that are available at each instant; it thus makes it possible to calculate the best possible path for the call to follow in order to reach an agent having appropriate competence as quickly as possible.

The use of signaling channels also makes it possible to implement virtual private networks (VPNs). In this type of network, numerous signaling channels are specific to the network and to its needs. The signaling signals which are transmitted over the signaling channel make it possible to provide numerous services satisfying demand from users of the network.

However, in VPNs, a public telecommunications network continues to be used for transmitting information other than signaling information. Thus, digital data packets, signals carrying voice, . . . , are transmitted over the public telecommunications network. Electronic correlation units then enable data traveling over the public telecommunications network to be recovered and made to correspond with the signaling signals that have been transmitted over the signaling channel.

Unfortunately, certain types of fault can occur and prevent signaling signals from transiting via the usual signaling channel. Such a fault can be associated with an access, with a trunk itself, or with an anomaly at one of the nodes of the network.

When a signaling channel which exists between two nodes of a network in normal operation is no longer usable, the principle of dynamic routing can enable a new path to be defined for the signaling signals. This new path enables the services to continue to be implemented over the entire network.

However, certain types of fault can lead to the network becoming split. A network is said to be "split" when the initial network is subdivided into two or more portions which can no longer communicate with one another. A private communications networks that has split then restricts the services that the network would otherwise offer in normal operation. For example, with a call distribution facility, certain operators can no longer be reached; their workload is consequently greatly reduced, while the workload on operators who can still be reached quickly becomes excessive. As a result, an outside user is put into communication with an operator more slowly, and even then the operator is perhaps less competent than the operator who would have been reached in normal operation. The outside user's opinion about the services on offer is then necessarily less good.

In order to resolve problems of a private network becoming split, the state of the art proposes so-called "redundancy" solutions which consist in taking the preventative measure of always doubling up existing signaling channels. Thus, for each signaling channel in use, there is also an identical signaling channel whose sole function is to take over the role of the first signaling channel in the event of that channel becoming faulty. However, as mentioned above, the cost of a signaling channel is not related to the volume of information that passes over the channel; merely renting it is expensive. Consequently, redundancy solutions are excessively expensive and are not necessarily satisfactory in the event where faulty operation of the network does not stem from a failed trunk but from a breakdown in one of the terminals.

OBJECTS AND SUMMARY OF THE INVENTION

The method of the invention serves to mitigate the problems and drawbacks described above. Implementing the method of the invention also makes it possible to have a private network that is very reliable in the sense that it ensures that the services made available by the network in normal operation continue to be available even in situations that would have caused the network to become split in the state of the art. Thus, for example, implementing the method of the invention makes it possible to satisfy users of a call distribution network on a continuous basis. Implementing the method is particularly advantageous for certain businesses whose customer assessment lies essentially in the quality of service that the call distribution facility belonging to the business is capable of providing.

To achieve these objects, the invention proposes also using emergency means which are implemented when a network split is detected. These emergency means ensure that signaling signals can continue to be transmitted between any two nodes of the network, and more particularly between two nodes belonging to portions that have become disjoint after the network has split. These emergency means are in the form of dynamic accesses that are made available on demand, i.e. only when requested. The user of the communications network can define a set of nodes in the network from which and to which such dynamic accesses can be set up.

The dynamic accesses can use various transmission means, e.g. relying on modems, on Ethernet links, or indeed on the B channel of an access to a communications circuit. In general, any medium that enables digital signaling signals to be transmitted can be used.

The invention provides a method of maintaining communications options within a private communications network involving nodes of the private exchange type, all nodes being capable of communicating with all other nodes in normal operation via two-way communications trunks interconnecting some of the nodes in pairs, the method comprising the steps consisting in:

detecting faulty operation that leads to the network becoming split; and implementing emergency means which provide one or more dynamic accesses for ensuring that all of the nodes of the network can again communicate with all of the other nodes, thereby maintaining a set of services proposed by the network in normal operation;

wherein, once the emergency means have been implemented, the method includes the additional step of transmitting calls through the network using routing that is static and predetermined.

This static and predetermined routing defines a single access path between a sending node and a destination node, the single access path being stored in the sending node and in the destination node.

A set of network nodes from which dynamic accesses are available is preferably defined by the user of the network before a fault causes the network to split. In a preferred implementation of the invention, dynamic accesses are implemented only to satisfy a request for communication between two nodes that have been disconnected by the network splitting.

Furthermore, the method of the invention can also include a step consisting in releasing dynamic accesses as soon as the fault that led to the network becoming split has itself ceased, and the last call supported by the dynamic accesses has finished. This feature of the invention makes it possible in particular to minimize the use of dynamic accesses and thus to maximize the use of communications trunks of the network in normal operation while nevertheless ensuring that the last call set up using the dynamic access means is not cut off. If dynamic accesses were to be released as soon as the faulty operation that led to the network becoming split has itself ceased, then all calls supported at that time by the dynamic accesses which carry in particular call references, would be lost.

BRIEF DESCRIPTION OF THE DRAWING

Various aspects and advantages of the present invention will be better understood on reading the following description with reference to the single FIGURE which is given by way of non-limiting indication.

The single FIGURE shows a network that has been split and the method of the invention being implemented as a result of the network splitting.

MORE DETAILED DESCRIPTION

The FIGURE shows a private communications network R0. It is made up of various nodes numbered 1 to 9. These nodes are interconnected by trunks A where the notation $A_{i,j}$ designates the trunk interconnecting terminal i and terminal j. The network R0 as shown thus has the following trunks $A_{1,2}$, $A_{1,3}$, $A_{1,4}$, $A_{4,5}$, $A_{4,6}$, $A_{4,7}$, $A_{4,8}$, $A_{5,9}$, and $A_{6,9}$.

The trunk $A_{1,4}$ is drawn using a dashed line to indicate that this trunk is not operating properly. Faulty operation of trunk $A_{1,4}$ leads to the network R0 being split into a first network portion R1 and a second network portion R2. The two network portions R1 and R2 are disjoint in that none of the nodes of the first network portion R1 can communicate directly, i.e. over a trunk available in the network in normal operation, with any of the nodes in the second network portion R2.

Each node of a communications network of the kind shown in the single FIGURE is aware at all times firstly of the various nodes that are adjacent thereto, i.e. that are connected directly thereto by a communications trunk, and secondly of the various nodes which it can reach, i.e. which are accessible to it via communications trunks and other nodes. Faulty operation causing the network R0 to split can thus be detected immediately by all of the nodes in the network.

When data is to be transmitted between one of the nodes in the first network portion R1 and one of the nodes in the second network portion R2, a dynamic access $AD_{3,4}$ is set up. This dynamic access serves to carry digital signaling signals between the two portions R1 and R2 of the network R0. The signaling channels can be transmitted using various different media: modems for converting digital and/or analog signals can have been installed beforehand in nodes 3 and 4. It is also possible to use links of the Ethernet type, a B channel in an access to a communications circuit, basic accesses, or indeed primary accesses which might be available in a public communications network. Under all circumstances, the signaling signals are no longer transmitted solely within the private network.

The various data that can accompany digital signaling signals can be transmitted from one portion of the network to the other over the communications circuits. These communications circuits are links that provide connection between a private network and the public communications network.

The dynamic access $AD_{3,4}$ is a dynamic signaling link that was created beforehand by the user of the network. Depending on the needs and priorities of the user of the network, a whole set of dynamic signaling links can be devised for use only in the event of a disturbance to operation in the normal network.

When such a network split is detected, calls are routed in a manner that is both static and predetermined. Routing is said to be static in opposition to routing that is dynamic in the sense that a call is required to follow a particular path to go from one node to another. The path is predetermined before faulty operation occurs which means that the network will react very quickly once faulty operation is detected.

In the event of the network splitting, once a dynamic access has been established, the signaling signals that pass between the two portions of the network are restricted as much as possible. Thus, in order to be able to use low data rate dynamic accesses, the static routing used relies on a smaller number of signaling signals than does dynamic routing.

Thus, for example, when a network is split as shown in the sole FIGURE, a call that needs to be set up between node 2 and node 6 can be constrained by the static routing data to pass successively via the nodes 1, 3, 4, 5, 9, and finally 6 even if, a priori, a shorter path is available. Information relating to static routing is contained in memories that are accessible for each node involved in such a static routing. Thus, in the example mentioned above, terminal 1 has information informing it that the signals it is to transmit to terminal 6 should pass via nodes 3, 4, 5, and 9.

As soon as the trunk $A_{1,4}$ is reestablished, any new call starting after the trunk $A_{1,4}$ has been reestablished between the first network portion R1 and the second network portion R2 will necessarily take the reestablished link $A_{1,4}$. Calls between the first network portion R1 and the second network portion R2 that are already using the dynamic trunk $AD_{3,4}$ are maintained until they end. When no further calls are using the dynamic trunk $AD_{3,4}$, it is released; it is no longer available for future calls so long as the network continues to operating normally, i.e. until the network is again split.

The method of the invention thus causes signaling signals to travel as much as possible over trunks that are set up permanently so as to release accesses that are set up dynamically, thereby reducing costs associated with the use of dynamic accesses.

The invention claimed is:

1. A method of maintaining communications options within a private communications network comprising a plurality of private exchange nodes, each of the nodes being capable of communicating with all other nodes in normal operation via two-way communications trunks interconnecting some of the nodes in pairs, the method comprising:

detecting faulty operation that leads to the network becoming split into at least two network portions which can no longer communicate with each other via any of the trunks of the private communications network;

implementing emergency means which provide at least one dynamic access for ensuring that all of the nodes of the network can again communicate with all of the other nodes, thereby maintaining a set of services proposed by the network in normal operation;

transmitting calls through the network using routing that is static and predetermined once the emergency means have been implemented; and restricting signals passing between the at least two network portions once the emergency means have been implemented.

2. A method of maintaining communications options within a private communications network according to claim 1, further comprising defining a set of network nodes from which the dynamic accesses are available prior to any faulty operation giving rise to the network being split.

3. A method of maintaining communications options within a private communications network according to claim 2, wherein the emergency means comprise modems disposed at the nodes defined prior to any faulty operation and from which dynamic access is available.

4. A method of maintaining communications options within a private communications network according to claim 1, wherein the dynamic access is implemented only to satisfy a call request between two nodes that can no longer be connected together once the network has split.

5. A method of maintaining communications options within a private communications network according to claim 1, wherein the static routing defines a single access path between a sending node and a destination node, the single access path being stored in the sending node and in the destination node.

6. A method of maintaining communications options within a private communications network according to claim 1, further comprising releasing the dynamic accesses as soon as the faulty operation that caused the network to split has ceased and the last call supported by the dynamic accesses has finished.

7. A method of maintaining communications options within a private communications network according to claim 1, wherein the emergency means utilizes Ethernet links.

8. A method of maintaining communications options within a private communications network according to claim 1, wherein the emergency means utilizes a B channel on an access of a communications circuit.

9. A method of maintaining communications options within a private communications network according to claim 1, wherein the signals are restricted such that a minimum of number of signals pass between the at least two network portions so as to ensure that all of the nodes of the network can communicate with all of the other nodes.

* * * * *